United States Patent [19]
Chen

[11] Patent Number: 5,998,529
[45] Date of Patent: Dec. 7, 1999

[54] COLORFUL COATING MATERIAL

[76] Inventor: Wei Chen, 918 Sol Vista Way, Walnut, Calif. 91789

[21] Appl. No.: 09/031,434

[22] Filed: Feb. 26, 1998

[51] Int. Cl.$^6$ ....................................................... C08K 3/34
[52] U.S. Cl. .......................... 524/451; 524/425; 524/442; 524/459; 524/803
[58] Field of Search .................................... 524/803, 459, 524/442, 425, 451

[56] References Cited

U.S. PATENT DOCUMENTS

| | | | |
|---|---|---|---|
| 5,661,216 | 8/1997 | Laginess et al. | 524/871 |
| 5,814,374 | 9/1998 | Nkansah et al. | 524/459 |

OTHER PUBLICATIONS

Marten, Kirk–Othmer Encyclopedia of Chemical Technology, 4th Ed., vol. 24, John Wiley & Sons, p. 980, 1997.
Leman, Kirk–Othmer Encyclopedia of Chemical Technology, 4th Ed. vol. 17, John Wiley & Sons, p. 1049, 1996.
Morris, Academic Press Dictionary of Science and Technology, Academic Press,. p. 2341, 1992.
Hawley's Condensed Chemical Dictionary, 13 th Ed., Van Nostrand Reinhold, p. 656, 1997.
Murphy, The Additives for Plastics Handbook, Elsevier, p. 10, 1996.

*Primary Examiner*—David W. Wu
*Assistant Examiner*—Ling Siu Choi
*Attorney, Agent, or Firm*—Raymond Y. Chan; David and Raymond

[57] ABSTRACT

The present invention provides a colorful coating material which consists essentially of a 10 to 40% of paint in weight, a 50 to 90% of talcum powder in weight and a 5 to 10% of volatile agent in weight. The paint, the talcum powder and the volatile agent are evenly mixed to form a plaster form coating mixture. The coating mixture is adapted for coating around an object by means of an extrusion mold to form a protective coating. When the protective coating is dried and solidified, a hard and durable protective coating shell is formed and wrapped around the object.

4 Claims, 5 Drawing Sheets

COLORFUL COATING MATERIAL

FIELD OF THE PRESENT INVENTION

The present invention relates to coating material, and more particularly to a colorful coating material adapted for integrally coating around an elongated strip body to form a durable and scratching resisting colorful protective coating shell.

BACKGROUND OF THE PRESENT INVENTION

Various kinds of construction strip, such as ceiling molding, skirting board, door frame, window frame, and furniture molding, are commonly used in interior construction and decoration. A conventional construction strip, no matter it is used as a ceiling molding, a skirting board, a door frame, a window frame, or a furniture molding, as shown in FIG. 1, comprises an elongated wooden strip body 10 having a predetermined length and stylish cross section. The strip body 10 has a rear surface 11 for attaching to the wall by means of nailing or gluing and a waved front surface 12 for decorating purpose.

Normally, a layer of paint must be provided on all exposed longitudinal surfaces of the strip body 10 so as to protect the wooden strip body 10 from moisture and to match the color painting of the wall or ceiling where the strip body 10 is affixed thereon. In view of such painting layer, the conventional wooden construction strip bears a plurality of unsolved shortcomings as follows:

(1) The painting process of the wooden construction strip is very troublesome and costly. The worker has to paint each construction strip manually before affixing to the wall. A lot of work and time must be involved that relatively increases the construction cost. Some construction strip manufacturers provide painted construction strips in market in order to lessen the labor of the constructors. The most efficient way for mass production of painted construction strip in factory is to spray paint on the wooden strip body by a painting machine. The painting machine generally comprises at least a spray gun which is driven to move up and down repeatedly and a feeding device for transmitting mass number of wooden strip bodies vertically towards the spray gun. While each strip body is passing by the spray gun, the strip body is driven to rotate and the spray gun is activated to move up and down and spray painting onto the rotating strip body, so that a layer of paint is applied on all longitudinal surfaces of the strip body.

How to apply painting evenly on all longitudinal surfaces of the strip body is one of the major problems of the spraying method of every strip body manufacturer. High efficiency and expensive painting machine is suggested to use in factory in order to produce strip bodies with better painting quality. Moreover, no matter what kind of painting machine is used, large amount of costly painting will be sprayed to the air during the spraying process, that causes unavoidable waste and pollution. Many chemicals in paint are harmful to human body. In other words, all workers are exposed in a hazardous environment, therefore how to collect those waste painting becomes another big problem to the manufacturer.

(2) The painting layer on the wooden strip body has poor resistance against scratching. During transportation and constructing procedure, there is a great chance to cause scratch on the exterior painting layer of the construction strip and that, due to the soft nature of the wooden strip body, the strip body also has a big risk of being damaged by scratching or accidentally impacting.

(3) The edge portion of the painting layer of the construction strip will easily be peeled off when the construction strip is cut to desired size and shape.

(4) If plastic or metal made tubes or strips are used, it is more difficult to provide a durable painting layer thereon.

(5) The contour design of the construction strip must be limited to avoid any sharp indention or concave edge because it is very difficult to evenly apply or spray paint on such area.

SUMMARY OF THE PRESENT INVENTION

It is thus a first object of the present invention to provide a colorful coating material adapted for coating around an elongated strip body or similar object to form a protective coating shell that has good resistance against scratching and peeling off.

A further object of the present invention is to provide a colorful coating material which is more durable and cheaper in cost in comparison with the conventional painting material.

Yet another object of the present invention is to provide a colorful coating material adapted for evenly coating on any indention or sharp edge formed on the strip body. Moreover, no paint will be waste and no air pollution will be caused during the coating process.

In order to accomplish the above objects, the present invention provides a colorful coating material which comprises a 10 to 40% of paint in weight, a 10 to 90% of talcum powder in weight and a 5 to 10% of volatile agent in weight. The paint, the talcum powder and the volatile agent are evenly mixed to form a plaster form coating mixture. The coating mixture is adapted for coating around an object by means of an extrusion mold to form a protective coating. When the content of the volatile agent in the protective coating is volatilized, the protective coating is dried and solidified to form a hard and durable protective coating shell which is wrapped around the object.

DETAILED DESCRIPTION OF THE PREFERRED EMBODIMENT

The present invention provides a colorful coating material which comprises a 10 to 40% of paint in weight, a 10 to 90% of talcum powder in weight and a 5 to 10% of volatile agent in weight, wherein the paint, talcum powder and volatile agent are evenly mixed to form a plaster form coating mixture. The coating mixture is adapted for coating around an object by means of an extrusion mold to form a protective coating. When the content of the volatile agent in the protective coating is volatilized, the protective coating is dried and solidified to form a hard and durable protective coating shell which is wrapped around the object.

According to a preferred embodiment of the present invention, the colorful coating material consists essentially of a 10 to 40% of latex in weight, a 10 to 90% of calsium in weight and a 5 to 10% of polyvinyl alcohol in weight. A preferable doze of 33 kg of the colorful coating material comprises 6 kg of latex, 25 kg of calsium 800 M and 2 kg of polyvinyl alcohol evenly mixed to form a plaster form coating mixture.

Figure 1:
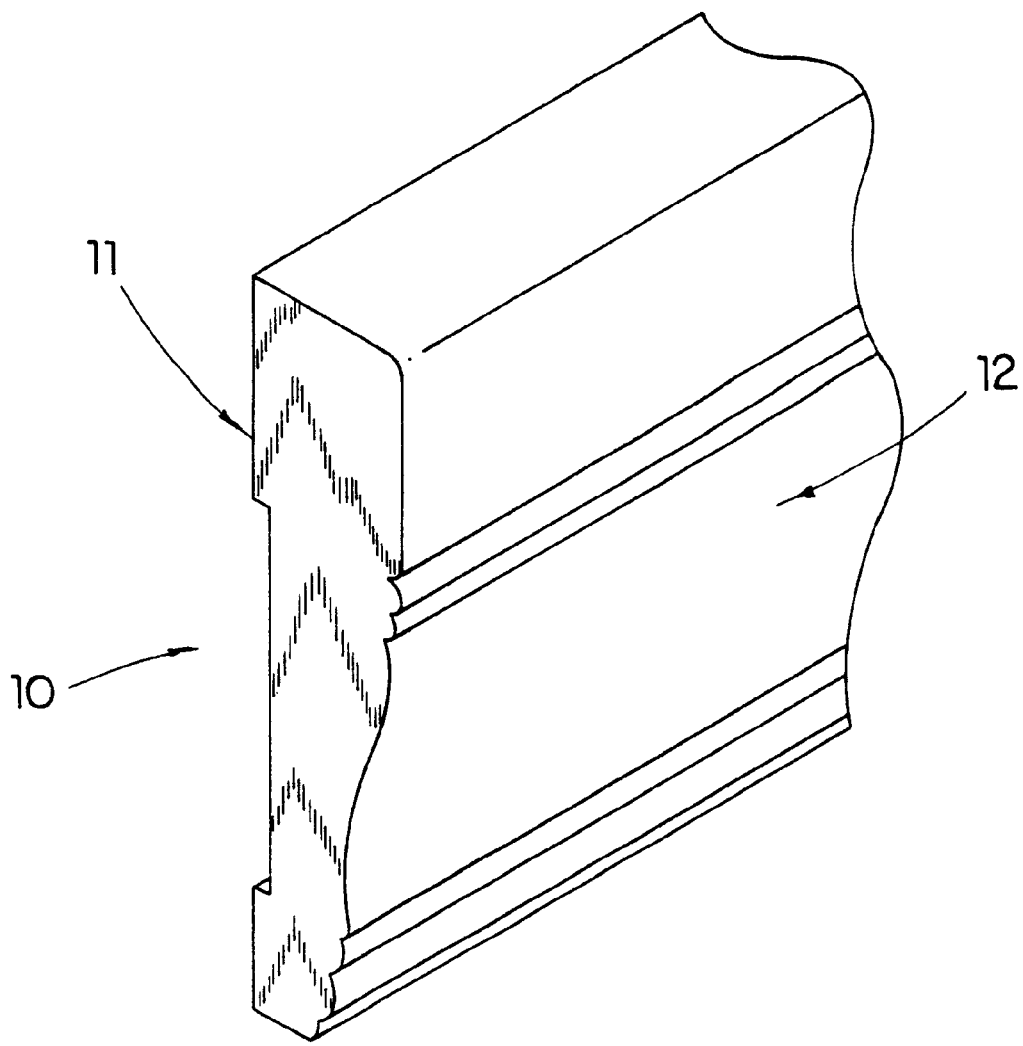
FIG. 1 is a perspective view of a conventional constructive strip.
Figure 2:
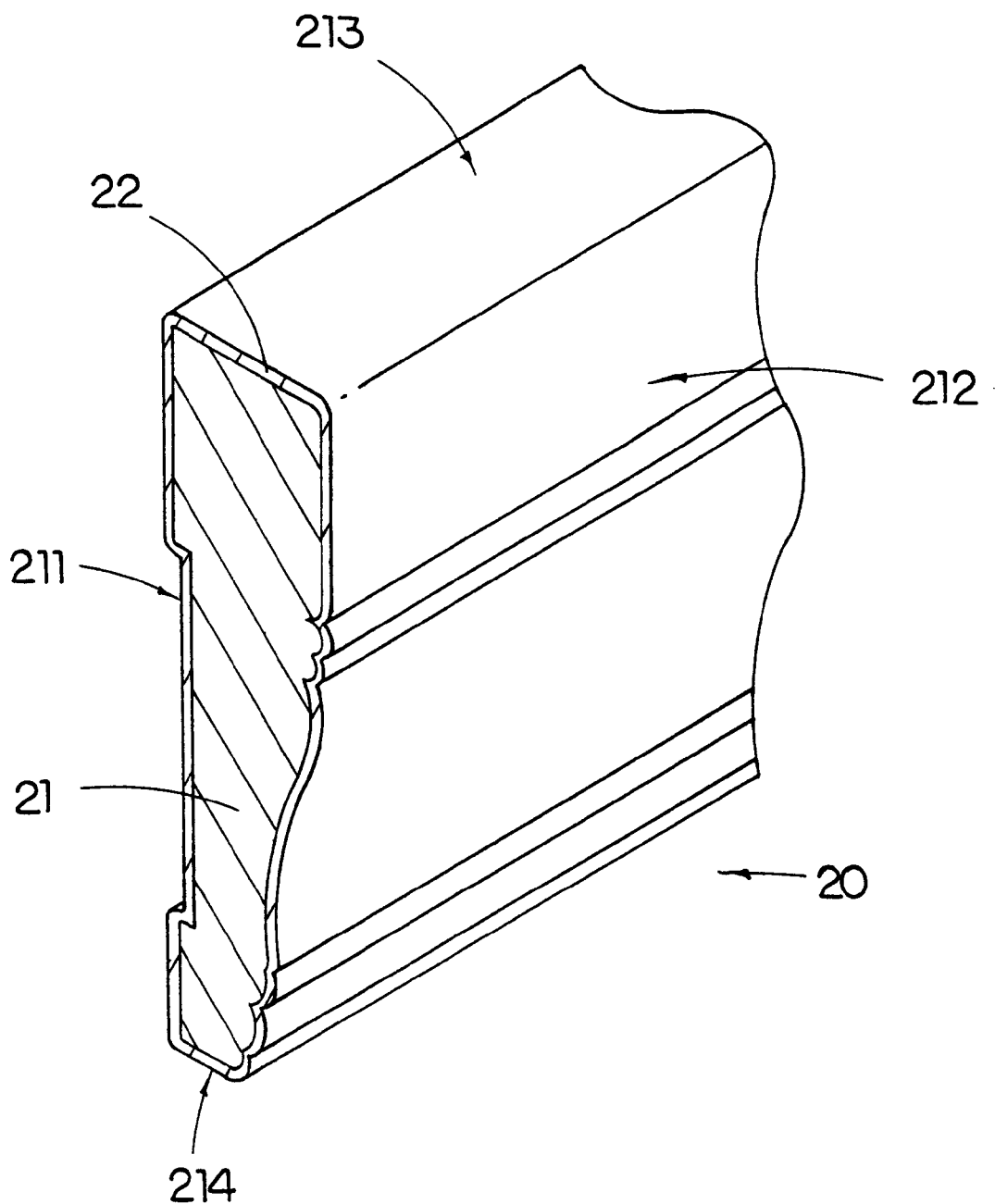
FIG. 2 is a sectional perspective view of a construction strip which is wrapped with a colorful coating material of the present invention.

The colorful coating material of the present invention can be coated around a variety of objects such as elongated strips, rods or tubes made of wood, plastic or metal. In order to illustrate how the colorful coating material applies to an object and performs remarkable properties, an embodying example is introduced as follows. As shown in FIG. 2, a construction strip 20 which is coated with the colorful coating material to form a protective coating shell 22 is illustrated. The construction strip 20 comprises an elongated strip body 21 which can be any shape having a uniform cross section shape and size. The strip body 21 has a plurality of longitudinal exterior surfaces 211 to 214, including an attaching rear surface 211, a decorating waved front surface 212, a top surface 213, and a bottom surface 214, extending along the length of the strip body 21.

The protective coating shell 22 which has a uniform thickness is integrally coated on the four longitudinal exterior surfaces 211 to 214 of the strip body 21, so as to form a colorful shelter layer wrapping around the strip body 21. In other words, the four longitudinal exterior surfaces 211 to 214 are evenly and uniformly coated with the protective coating shell 22 to form an integrated body.

The protective coating shell 22 which is dried from the colorful coating material comprises a predetermined amount of paint and talcum powder evenly mixed. The talcum powder is the basic content for forming the rigid shell body of the protective coating shell 22. The paint serves as the color content of the protective coating shell that provides the protective coating shell 22 with desired color and a daubing ability. In other words, the paint content in the protective coating shell 22 helps the protective coating shell 22 to be integrally and firmly attached on the longitudinal exterior surfaces 211 to 214 of the strip body 21. The presence of the talcum powder enables the protective coating shell 22 having the specific properties of hardness, adhesion, solidification, scratching resistance, and rigidity. The protection coating shell 22 has 10% to 40% of the paint in weight and 10% to 90% of the talcum powder in weight.

Figure 3:
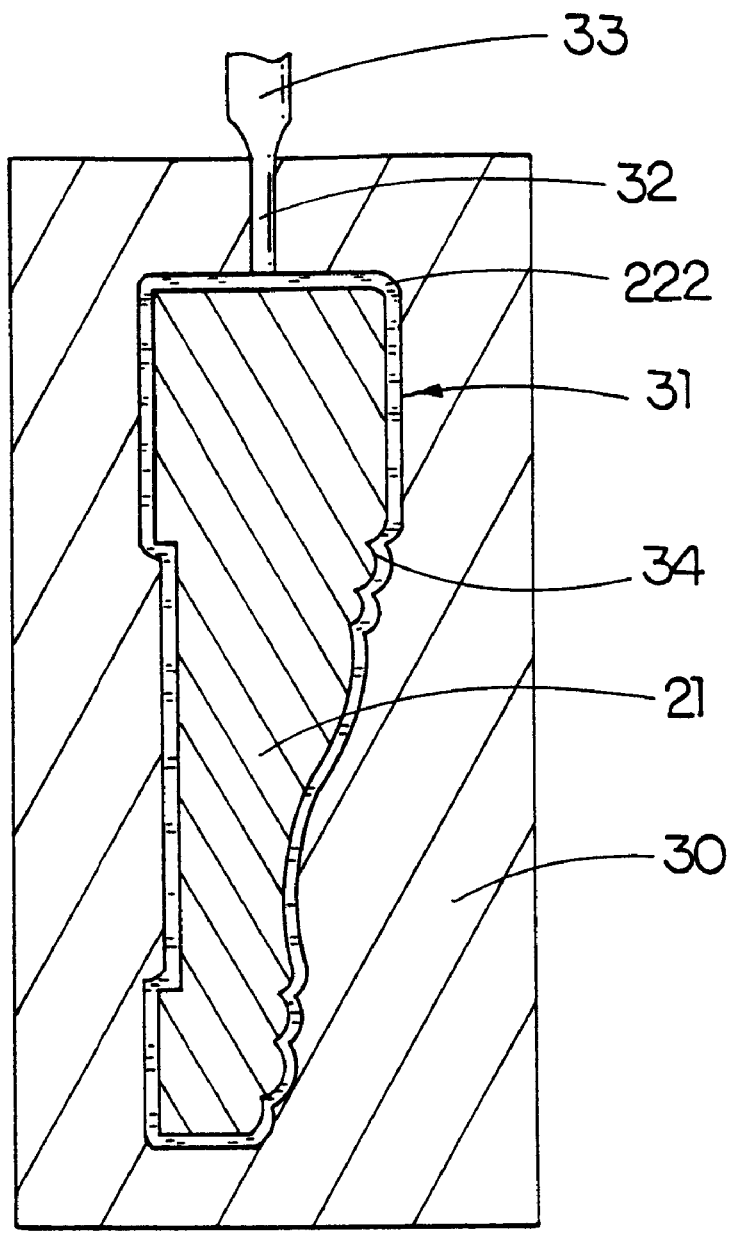
FIG. 3 is a sectional view of an extrusion mold which is equipped to coat the colorful coating material around a strip body according to the present invention.

According to the present preferred embodiment, latex is used as the paint while calsium is used as the talcum powder and polyvinyl alcohol is used as the volatile agent. As shown in FIG. 3, the protective coating shell 22 is integrally coated on the strip body 21 by means of an extrusion mold 30 which has an extrusion passage 31 provided therethrough and an injection tunnel 32 extended from the extrusion passage 31 to an injection inlet 33. The extrusion passage 31 has a sectional size slightly larger than a sectional size of the strip body 21, so that a surrounding clearance 34 is formed between an interior wall of the extrusion passage 31 of the extrusion mold 30 and the longitudinal exterior surfaces 211 to 214 of the strip body 21.

Figure 4A:
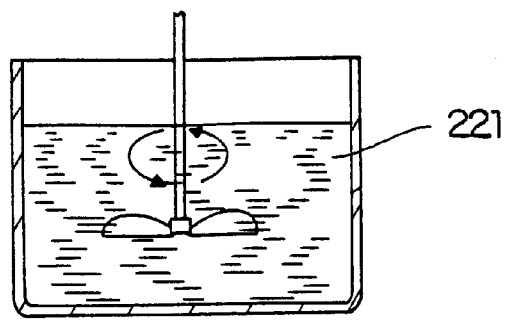
FIGS. 4A to 4C are schematic drawings illustrating the steps of coating the colorful coating material of the present invention onto a construction strip.
Figure 4B:
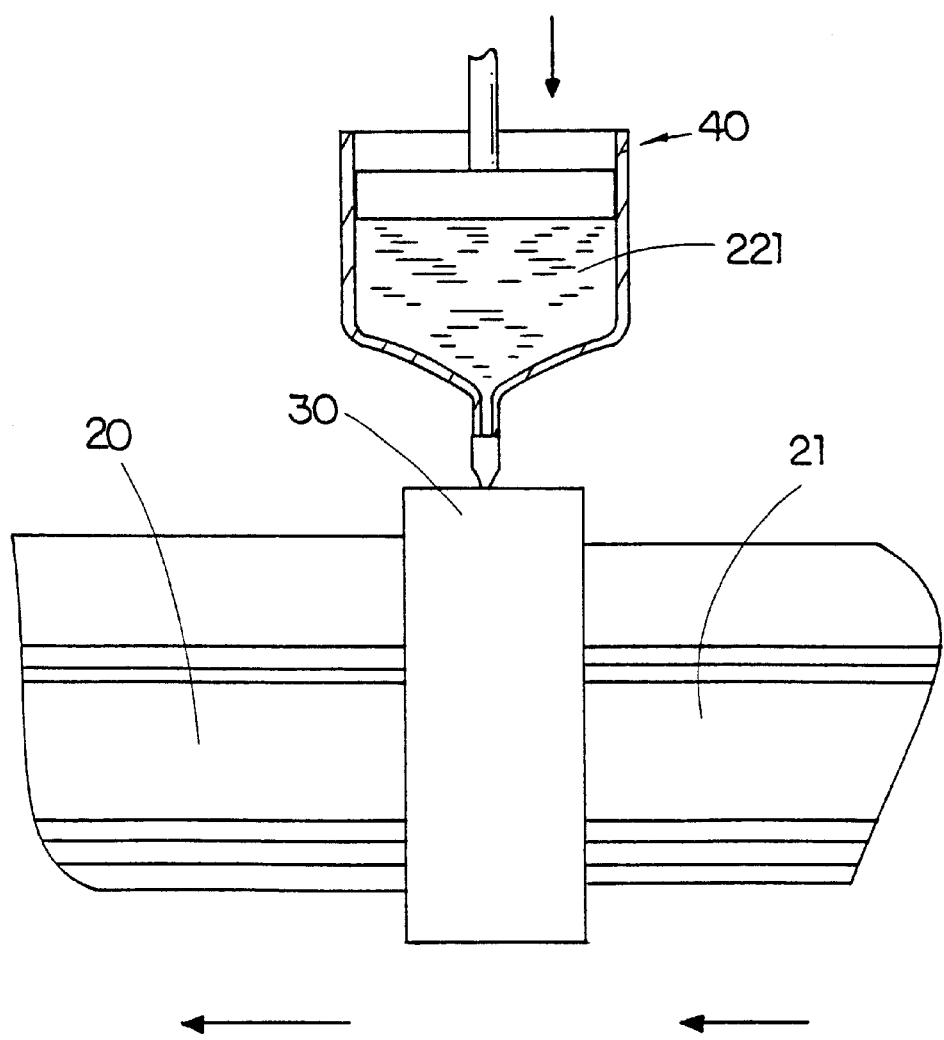

In order to coat the protective coating shell 22 on the strip body 21, the elongated strip body 21 is forced to pass through the extrusion passage 31 of the extrusion mold 30. As mentioned above, a predetermined amount of evenly mixed colorful coating material 221 is collected in a tank 40. The tank 40 of plaster form colorful coating material 221 is connected to the injection inlet 33, as shown in FIG. 4B. The plaster form colorful coating material 221 is gradually injected into the extrusion passage 31 through the injection tunnel 32 to fill the surrounding clearance 34, so that the exterior surfaces 211 to 214 of a portion of the strip body 21 that is passing through the extrusion passage 31 will be evenly sticked and coated with a layer of the colorful coating material 221 to form a plaster form protective coating 222, wherein the volatile agent will be volatilized and renders the protective coating 222 to form the dry and rigid protective coating shell 22.

Figure 4C:
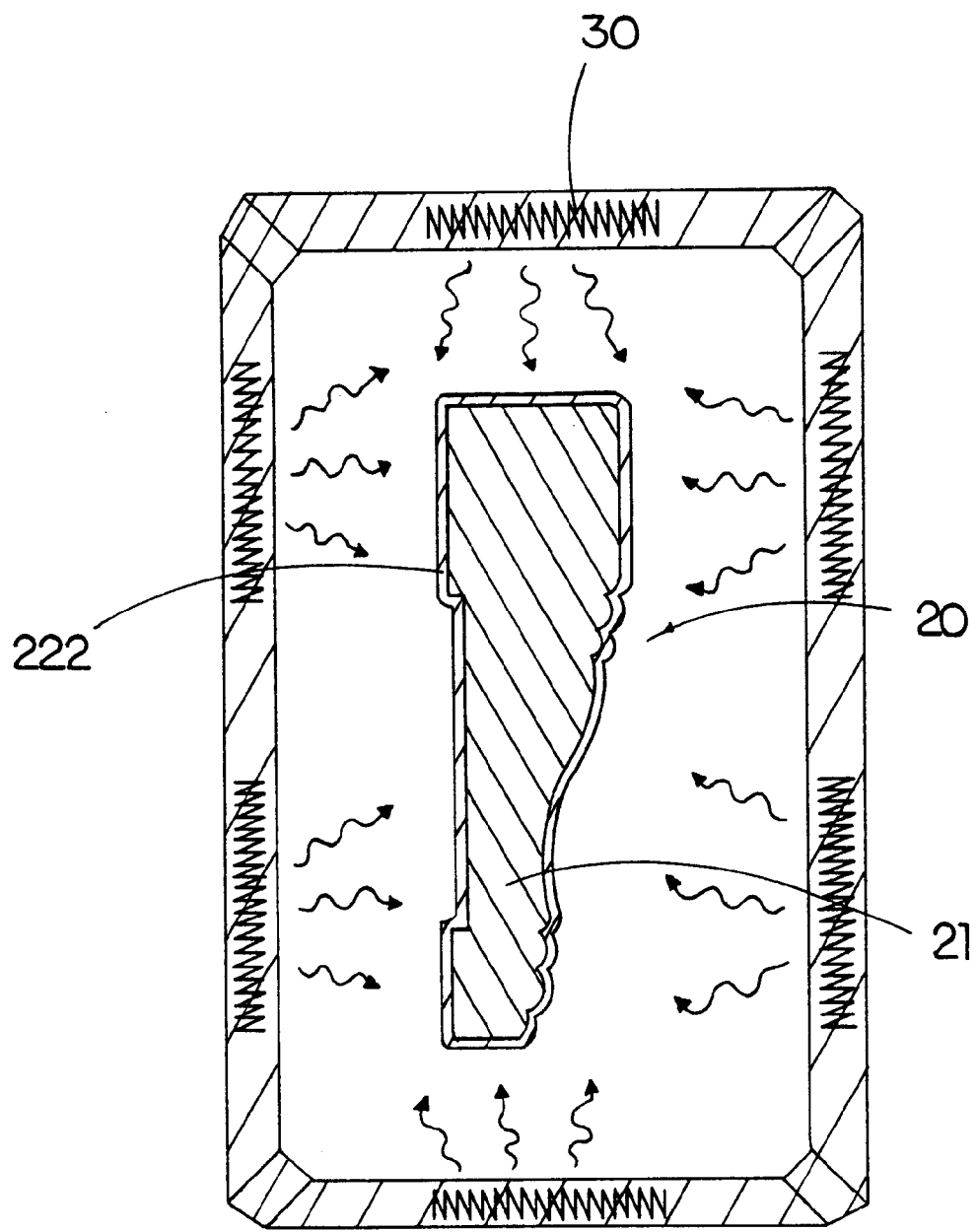

The strip body having coated with a layer of protective coating 222 is then transmitted to pass through a drying means 50 where heat is applied to facilitate the solidification of the protective coating 222 to form the hard and durable protective coating shell 22, as shown in FIG. 4C. The protective coating 222 on the strip body 22 can also be dried naturally in air, wherein the volatile agent will gradually volatilize so that the protective coating 222 will be solidified to form the protective coating shell 22. About thirty minutes will be consumed for this volatilization step.

In stead of daubing a painting layer on the strip body, the construction strip of the present invention integrally coats a colorful protective coating shell 22 on the strip body 21 to shelter the strip body 21 from moisture. Moreover, since the protective coating shell 22 has good resistance against scratching and peeling off, the construction strip 20 is well protected from scratching and can be cut to any size and shape without the worrisome of peeling off The protective coating shell 22 is a waterproof hard shell wrapped around the interior strip body 21, so that the user may wash the construction strip 20 periodically. In other words, the construction strip 20 of the present invention is more durable and cheaper in cost in comparison with the conventional painted wooden construction strip. Furthermore, since the protective coating shell 22 is coated on the strip body 21 by molding, the protective coating shell 22 can be evenly coated on any indention or sharp edge formed on the strip body 21.

What is claimed is:

1. A colorful coating material consisting essentially of a 10% to 40% of paint in weight, a 50% to 90% of talcum powder in weight and a 5% to 10% of volatile agent in weight, wherein said paint, said talcum powder and said volatile agent are evenly mixed to form a plaster form coating mixture which is adapted for coating around an object by means of an extrusion mold to form a protective coating, wherein said protective coating is dried and solidified to form a hard and durable protective coating shell which is wrapped around said object.

2. A colorful coating material as recited in claim 1 wherein said paint comprises a latex, said talcum powder comprises a calsium and said volatile agent comprises a polyvinyl alcohol.

3. A colorful coating material consisting essentially of a 10% to 40% of latex in weight, a 50% to 90% of calsium in weight and a 5% to 10% of polyvinyl alcohol in weight, wherein said latex, said calsium and said polyvinyl alcohol are evenly mixed to form a plaster form coating mixture which is adapted for coating around an object by means of an extrusion mold to form a protective coating, wherein said protective coating is dried and solidified to form a hard and durable protective coating shell which is wrapped around said object.

4. A colorful coating material consisting essentially of 6/33 of a latex in weight, 25/33 of a calsium in weight and 2/33 of a polyvinyl alcohol in weight, wherein said latex, said calsium and said polyvinyl alcohol are evenly mixed to form a plaster form coating mixture which is adapted for coating around an object by means of an extrusion mold to form a protective coating, wherein said protective coating is dried and solidified to form a hard and durable protective coating shell which is wrapped around said object.

* * * * *